(12) United States Patent
Tian et al.

(10) Patent No.: US 6,825,363 B2
(45) Date of Patent: Nov. 30, 2004

(54) COMPOUNDS USEFUL IN OPTICAL SWITCHING AND MANUFACTURING METHOD THEREOF

(75) Inventors: Minquan Tian, Nakai-machi (JP); Makoto Furuki, Nakai-machi (JP); Lyong Sun Pu, Suwon (KR); Yasuhiro Sato, Nakai-machi (JP); Izumi Iwasa, Nakai-machi (JP); Satoshi Tatsuura, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 83 days.

(21) Appl. No.: 10/404,655

(22) Filed: Apr. 2, 2003

(65) Prior Publication Data

US 2003/0220511 A1 Nov. 27, 2003

(30) Foreign Application Priority Data

Apr. 2, 2002 (JP) ...................... 2002-099794

(51) Int. Cl.$^7$ ..................... C07D 307/80; C07D 307/81
(52) U.S. Cl. ................. 549/304; 549/305; 549/307
(58) Field of Search ................. 549/304, 305, 549/307

(56) References Cited

FOREIGN PATENT DOCUMENTS

| JP | A 11-282034 | 10/1999 |
|---|---|---|
| JP | A 2000-111967 | 4/2000 |

OTHER PUBLICATIONS

"Nikkan Kogyo Shimbun," Business & Technology, pp. 1, Jul. 13, 1998.
"Nikkei Sangyo Shimbun," pp. 5, Jul. 8, 1999.

Furuki et al., "Monomolecular layer of squarylium dye J aggregates exhibiting a femtosecond optical response of delocalized excitons," Applied Physics Letters vol. 72, No. 21, pp.2648–2650, May 25, 1998.

Furuki et al., "Observation of sub–100–fs optical response from spin–coated films of squarylium dye J aggregates," Applied Physics Letters vol. 78, No. 18, pp.2634–2636, Apr. 30, 2001.

Nakazumi et al., "Near–Infrared Absorbing Dyes," Chem. Rev. 92, pp. 1197–1226, Mar. 16, 1992.

*Primary Examiner*—Ba K. Trinh
(74) *Attorney, Agent, or Firm*—Oliff & Berridge, PLC (57) ABSTRACT

A dibenzofuranonylium methylate compound represented by the following formula (I), having maximum absorption wavelength of over 1 μm, high thermal stability and good solubility in organic solvents, and a production method thereof are provided:

General Formula (I)

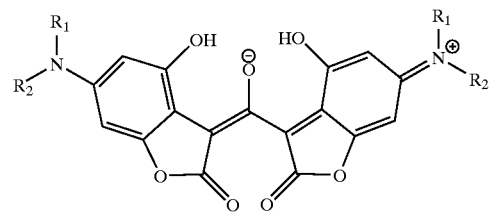

where $R_1$ and $R_2$ may be identical or different from each other and each represents a linear alkyl group or a branched alkyl group, respectively.

6 Claims, 5 Drawing Sheets

COMPOUNDS USEFUL IN OPTICAL SWITCHING AND MANUFACTURING METHOD THEREOF

BACKGROUND OF THE INVENTION

1. Field of the Invention

This invention relates to novel compounds useful, for example, in optical switching, as well as a production method thereof.

2. Description of the Related Art

Figures 5A, 5B:
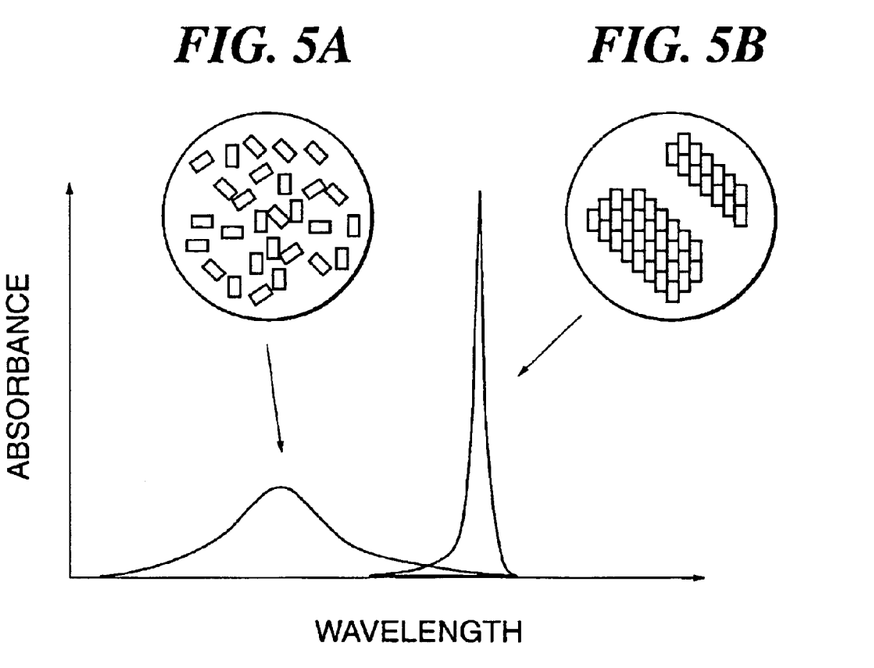
FIG. 5 is a graph showing absorption spectra of a dye molecule in which are shown FIG. 5A absorption spectrum of the dye molecules dispersed at random and FIG. 5B absorption spectrum of the dye molecules forming an aggregate.

It has been known that some of dye derivatives, particularly, cyanine, porphyrin or squarylium dye derivatives form aggregates. The aggregate means a body in which several tens to several hundreds of molecules are regularly arranged and bonded loosely and behave optically as if they were a single super molecule. Particularly, the one shown in FIG. 5 having an absorption band FIG. 5B which is shifted toward a longer wavelength side and sharpened as compared with an absorption band FIG. 5A of a single molecule is referred to as J-aggregate.

It has been reported that the J-aggregate emits fluorescence with small Stokes shift, has extremely large interaction with light of a wavelength near the absorption peak and shows extremely rapid recovery from bleached absorption as a third-order nonlinear optical effect (M. Furuki, L. S. Pu, F. Sasaki, S. Kobayashi and T. Tani, Appl. Phys. Lett., 72, 21 (1998) 2648). Further, it has been confirmed that the optical response time of a thin film of squarylium dye aggregates formed on a solid substrate is 300 fs (1 fs=$10^{-15}$ seconds) or less (Page 1 of Nikkan Kogyo Shimbun, dated Jul. 13, 1998). Further, a thin film of aggregates of a squarylium dye derivative having an ultrafast response characteristic of less than 100 fs which can be driven at an energy as low as 80 fJ/$\mu m^2$ has been attained (Page 5 of Nikkei Sangyo Shimbun, dated Jul. 8, 1999; M. Furuki, M. Tian, Y, Sato, L. S. Pu, H. Kawashima, S. Tatsuura and O. Wada, Appl. Phys. Lett., 78, 18(2001) 2634). With the feature described above, it is considered that a thin film of aggregates of a squarylium derivative can be used as an optical switch in optical information communication of terabit ($10^{12}$ bit/s) order.

The present inventors have confirmed that the squarylium dye derivative forms aggregates on a solid substrate and they exhibit an ultrafast optical response characteristic of femtosecond order, for which patent applications were already filed (Japanese Published Unexamined Patent Application No. Hei 11-282034 and Japanese Published Unexamined Patent Application No. 2000-111967). However, since the ultrafast optical response of such a dye aggregate film can be obtained only for light of a wavelength near the absorption peak of the aggregates (780 nm), it is difficult at present to apply the film to optical switches that operate at a wavelength exceeding 1 $\mu$m. Since the wavelength of the signal light in actual optical fiber communication networks is 1.3 $\mu$m or 1.55 $\mu$m, it is essential for the optical switch applicable to a communication system to use a dye having an intense absorption near 1.3 $\mu$m or 1.55 $\mu$m. On the other hand, there have so far been several kinds of near-infrared-absorbing dyes having maximum absorption wavelengths of 1 $\mu$m or more (J. Fabian, H. Nakazumi and M. Matsuoka., Chem. Rev, 92 (1992) 1197).

However, the long-wavelength-absorbing dyes have a feature that the dye molecule includes a large π-conjugated system, and have the following problems:
1) The molar absorption coefficient of the dye is small.
2) The thermal stability is poor since the π-conjugated system is excessively long.
3) The solubility in organic solvents is poor, making it difficult to form a film.

Accordingly, the existent long-wavelength-absorbing dyes are difficult to apply to optical switches. In order to solve this subject, it is necessary to make improvements such as an increase of the solubility of the long-wavelength-absorbing dye, improvement of the thermal stability and sublimation property of the dye and control for the aggregation of the dye molecules in the film.

For the reasons described above, near-infrared-absorbing dyes having maximum absorption wavelengths of 1 $\mu$m or more and having high thermal stability and good solubility have been demanded.

SUMMARY OF THE INVENTION

This invention provides novel compounds having maximum absorption wavelengths of over 1 $\mu$m, and having high thermal stability and good solubility in organic solvents, as well as a production method thereof.

The present inventors have made earnest studies for attaining the foregoing goal and, as a result, have found dye molecules of a novel basic skeleton having an extremely effective acceptor structure at the center.

An aspect of the present invention provides a novel compound represented by a general formula (I):

General Formula (I)

where $R_1$ and $R_2$ may be identical or different from each other and each represents a linear alkyl group or a branched alkyl group, respectively.

The compound shows maximum absorption near 1.1 $\mu$m and the absorption wavelength thereof can be made longer without excessive extension of the conjugation system as in the existent long-wavelength-absorbing dyes. Further, it has high thermal stability and good solubility in organic solvents such as acetone and chloroform and, further, it is excellent also in view of sublimation property and film-formation property.

In the general formula (I), $R_1$ and $R_2$ may be identical or different from each other and each preferably represents a linear alkyl of 1 to 7 carbon atoms or a branched alkyl group of 3 to 7 carbon atoms, respectively, with isobutyl group being particularly preferred.

According to another aspect of the present invention, a compound of the general formula (I) is obtained by a production method including a step of reacting the aniline derivative represented by a general formula (II) with 4,5-dihydroxy-4-cyclopentene-1,2,3-trione shown by a general formula (III).

General formula (II)

General formula (III)

In the general formula (II), $R_1$ and $R_2$ may be identical or different from each other and each represents a linear alkyl group or a branched alkyl group, respectively.

DESCRIPTION OF THE ACCOMPANYING DRAWINGS

Preferred embodiments of the present invention will be described in detail based on the followings, wherein.

PREFERRED EMBODIMENTS OF THE INVENTION

The novel compound according to this invention is represented by the following general formula (I).

General Formula (I)

In the general formula (I), $R_1$ and $R_2$ may be identical or different from each other and each represents a linear alkyl group or a branched alkyl group, respectively, and a linear alkyl group of 1 to 7 carbon atoms or a branched alkyl group of 3 to 7 carbon atoms is preferred. Specifically, methyl group, ethyl group, n-propyl, n-butyl group, isopropyl group, isobutyl group, sec-butyl group or tert-butyl group are more preferred, and methyl group, ethyl group, n-propyl group, n-butyl group, isopropyl group, or isobutyl group are particularly preferred.

The compound shows maximum absorption near 1.1 μm and the absorption wavelength thereof can be made greatly longer without excessive extension of the conjugation system as in the existent long-wavelength-absorbing dyes. Further, it has high thermal stability, good solubility in organic solvents such as acetone and chloroform and also has good film-formation property. Further, it is also excellent in view of sublimation property. The reason is thought to be that the central difuranonylium methanolate which is the skeleton of the compound shown by the general formula (I) has a far better acceptor property compared with squaric acid or croconic acid known so far. By utilizing this basic skeleton structure, a dye molecule having absorption in an extremely long wavelength region can be obtained with a relatively short conjugation system and, accordingly, it is considered that the dye molecule is excellent in long wavelength absorbability, thermal stability, solubility, film-formation property and sublimation property compared with the existent near-infrared-absorbing dyes.

Further, the compound represented by (I) is useful for an optical switch having ultrafast responsiveness. Further, since the compound is excellent in solubility and film-formation property, their films can be formed easily by solution-coating and it is applicable to various fields such as electrophotography, optical recording disks and organic solar cells in addition to the field of optical switches.

Further, the dye compound according to this invention can take the structure as shown by the following structural formula.

A dye compound shown by the following structural formula has the same characteristic as the characteristic of the compound having the structural formula shown by the general formula (I) described above.

The novel compound described above can be obtained by a production method including the step of reacting the aniline derivative represented by the following general formula (II) and 4,5-dihydroxy-4-cyclopentene-1,2,3-trione represented by the following general formula (III).

General formula (II)

General formula (III)

In the general formula (II), $R_1$ and $R_2$ may be identical or different from each other and each represents respectively a linear or a branched alkyl group, respectively.

The aniline derivative of the general formula (II) and 4,5-dihydroxy-cyclopentene-1,2,3-trione represented by the general formula (III) are preferably reacted in a solvent under the condition of azeotropic reflux and it is further preferred to react them together with a dehydrating agent in a solvent under the condition of azeotropic reflux. The obtained compound can be further purified by flash column chromatography and recrystallization after washing.

In the production method of this invention, the molar ratio of the aniline derivative to 4,5-dihydroxy-cyclopentene-1,2,3-trione (mol number of aniline derivative/mol number of 4,5-dihydroxy-cyclopentene-1,2,3-trione) is preferably from 100 to 300% and more preferably, from 150 to 250%.

When the molar ratio of the aniline derivative is less than 100%, the novel compound is less likely to be formed, whereas when it exceeds 300%, by-products increase and it is difficult to separate and purify the aimed compound.

There is no particular restriction on the reaction solvent for the production method, and alcohols such as 1-propanol, 1-butanol and 1-pentanol, aromatic hydrocarbons such as benzene, toluene, xylene and monochlorobenzene, ethers such as tetrahydrofurane and dioxane, halogenated hydrocarbons such as chloroform, dichloroethane, trichloroethane, and dichloropropane, and amides such as N,N-dimethylformamide and N,N-dimethylacetamide can be used. The alcohol solvent may be used alone but solvents such as aromatic hydrocarbons, ethers, halogenated hydrocarbons or amides are preferably used after being mixed with 1% by volume or more of an alcohol solvent. Among them, 1-propanol, 2-propanol, 1-butanol, 2-butanol, a mixed solvent of 1-propanol and benzene, a mixed solvent of 1-propanol and toluene, a mixed solvent of 1-propanol and N,N-dimethylformamide, a mixed solvent of 2-propanol and benzene, a mixed solvent of 2-propanol and toluene, a mixed solvent of 2-propanol and N,N-dimethylformamide, a mixed solvent of 1-butanol and benzene, a mixed solvent of 1-butanol and toluene, a mixed solvent of 1-butanol and N,N-dimethylformamide, a mixed solvent of 2-butanol and benzene, a mixed solvent of 2-butanol and toluene and a mixed solvent of 2-butanol and N,N-dimethylformamide are preferred. When the mixed solvent is used, the concentration of the alcohol solvent is preferably 1% by volume or more and, more preferably, 5 to 75% by volume.

While a production method may be conducted without using the dehydrating agent, use of the dehydrating agent can provide a merit such as shortening of the reaction time and improvement in the yield. There is no particular restriction on the hydrating agent so long as it does not react with the compounds represented by the general formula (II) and the general formula (III). Orthoformate esters such as trimethyl orthoformate, triethyl orthoformate, tripropyl orthoformate, tributyl orthoformate, and molecular sieves can be used.

The temperature of the reaction solution in the production method is 60° C. or higher and, particularly, preferably, 75° C. or higher. Actually, when the mixed solvent of 1-butanol and toluene is used as a reaction solvent, the temperature of the reaction solution is preferably from 75 to 105° C.

The reaction time for the production method varies depending on the temperature of the reaction solution in the production method in which the reaction time is shorter as the temperature of the reaction solution is higher while the reaction time is longer as the temperature of the reaction solution is lower. Specifically, when the mixed solvent of 1-butanol and toluene is used as the reaction solvent and the reaction solution is reacted at 90 to 105° C., the reaction time is preferably from 5 to 30 minutes.

The reaction described above is conducted preferably in an atmosphere of nitrogen gas.

The structural formulae of specific examples of the novel compounds according to this invention obtained by the above-described production method are shown below.

The novel compounds produced as described above show maximum absorption at approximately 1.1 µm and have high thermal stability and good solubility.

For the absorption characteristic of such compounds, absorption spectra were measured by use of a near infrared photospectrometer to confirm that they could be utilized as materials for the optical switch operating at a wavelength of 1.3 µm. Further, for the thermal stability, the thermal decomposition temperature was measured by thermogravimetry and differential thermal analysis to confirm that they were thermally stable materials for the optical switch. Further, their solubility in organic solvents such as chloroform and acetone was confirmed.

EXAMPLE

This invention is to be explained more specifically with reference to the following examples but the invention is not restricted only to these examples.

Example 1

Production of Compound (1)

3.325 g (14.0 mmol) of 3,5-dihydroxy-N,N-diisobutylaniline and 995 mg (7.0 mmol) of 4,5-dihydroxy-4-cyclopentene-1,2,3-trione were added to a mixed solution of 45 ml of 1-butanol and 135 ml of toluene, and the reaction solution was heated to 95° C. while stirring in a nitrogen gas atmosphere and reacted at 95 to 105° C. for 15 minutes. Water formed by the reaction was removed by azeotropic distillation. After the reaction was completed, toluene and 1-butanol were removed by vacuum distillation, and 150 ml of hexane was added to the resulting mixture. After cooling, the precipitated solids were filtered and washed with hexane, to give a brown-purple solid.

From the solid, a purple fraction was fractionated by flash column chromatography (filler: neutral silica gel; developing solvent:dichloroethane and a mixed solvent of dichloroethane and methanol (volume ratio: 100:1)) to give a black-purple solid. The black-purple solid was purified by recrystallization successively from methanol, a mixed solvent of acetone and hexane and a mixed solvent of acetone and methanol, and then dried to give the target compound (1) (a compound of the general formula (I) in which both $R_1$ and $R_2$ are isobutyl groups)(black-purple needle microcrystals), 301 mg (yield 7.4%).

Melting point: none;

Decomposition point: 202.7° C.

IR absorption spectrum (KBr tablet method): $v_{max}$=3436 (OH), 3101, 3033 (=C—H), 2961 (CH$_3$), 2930 (CH$_2$), 2871 (CH$_3$), 2740, 1783, 1754 (C=O), 1637, 1553, 1514, (C=C ring), 1471, 1381, (CH$_3$, CH$_2$), 1330 (C—N), 1281, 1252 (C—O—C), 1228 (OH), 1160, 1141 (C—O—C), 1092, 1024(C—O$^-$), 944, 921, 886, 869, 809, 791 cm$^{-1}$.

Figure 1:
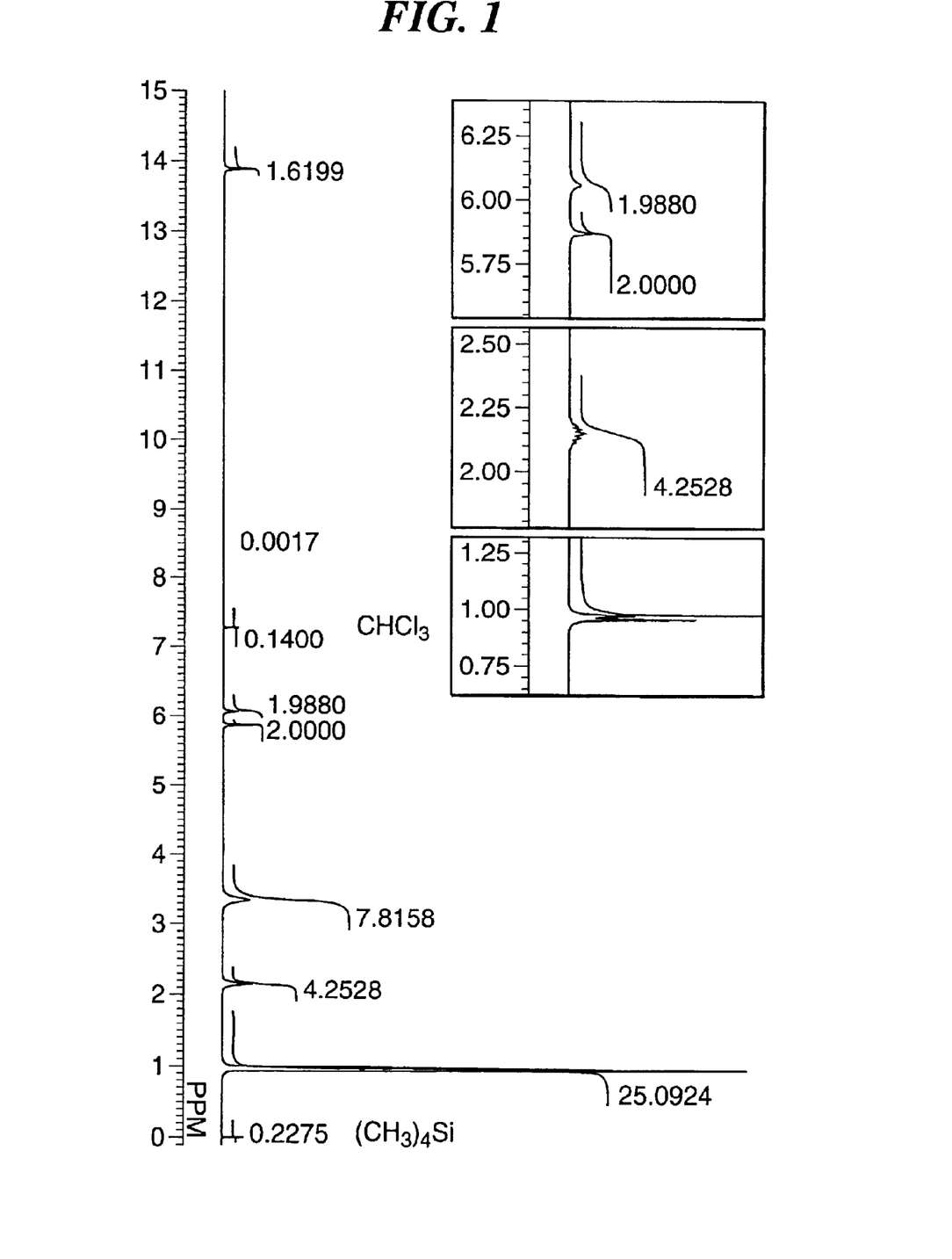
FIG. 1 is a graph showing $^1$H-NMR spectra (in a CDCl$_3$ solution) for the compound produced in Example 1.

$^1$H-NMR spectrum (CDCl$_3$)(FIG. 1): δ=13.880 (s, 2H, OH), 6.060 (s, 2H, H$_{arom}$), 5.875 (s, 2H, H$_{arom}$) 3.353 (br s, 8H, 4×NCH$_2$), 2.196–2.095 (m, 4H, 4×CH), 0.960 (d, J=6.59 Hz, 24H, 8×CH$_3$).

$^{13}$C-NMR Spectrum (CDCl$_3$): δ=165.22 (br s, C—O$^-$), 159.28 (s, COO) 156.63 (s, C$_{arom}$—OH, C$_{arom}$—OCO), 156.50 (s, C$_{arom}$—N), 119.62 (s, =C), 95.71 (s, 2C, C$_{arom}$), 90.33 (s, 4C, C$_{arom}$), 61.03 (s, NCH$_2$), 28.38 (s, CH), 02.12 (s, CH$_3$).

Mass Spectrum (FD): m/z=578 (M$^+$, 100%), 579 (M$^+$+1, 57.7%).

Elemental Analyses:

|   | Measured value | Calculated value |
|---|---|---|
| C | 68.3% | 68.49% |
| H | 7.25% | 7.32% |
| N | 4.81% | 4.84% |
| O | 19.1% | 19.35% |

Figure 2:
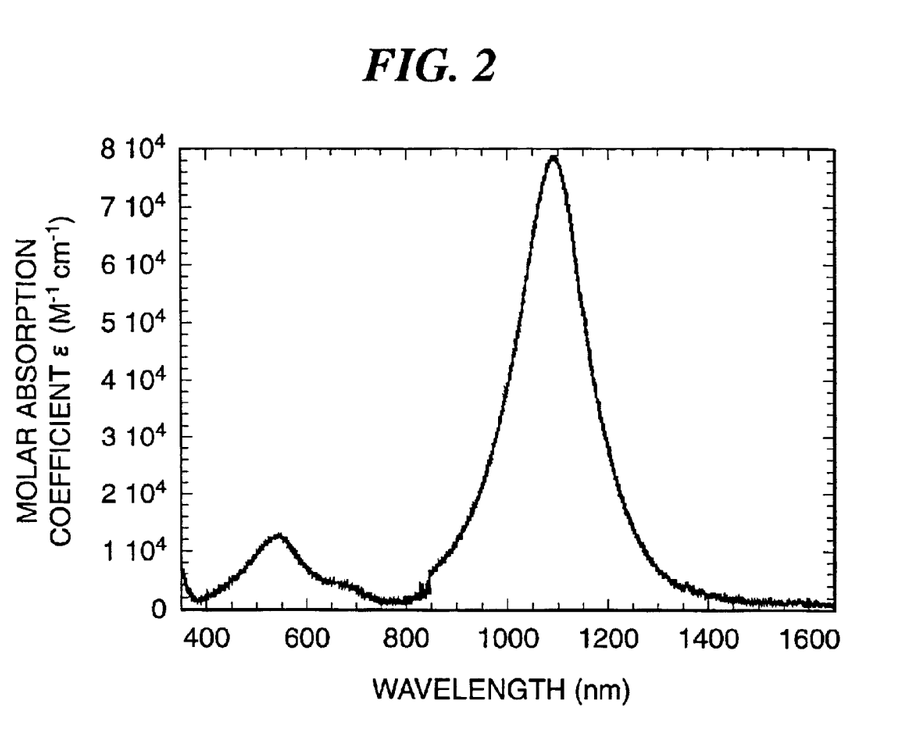
FIG. 2 is a graph showing absorption spectrum (in a dichloroethane solution) for the compound produced in Example 1.

Visible-near-infrared absorption spectrum (FIG. 2):

$\lambda_{max}$=1093.2 nm (in dichloroethane solution)

$\epsilon_{max}$=7.87×10$^4$ M$^{-1}$cm$^{-1}$ (in dichloroethane solution)

As a result of calculation based on the visible-near-infrared absorption spectrum, it was confirmed that the absorption oscillator strength f for the absorption band at 1.1 μm of the novel compound (1) obtained in this example was 0.623. Further, the solubility of this compound in chloroform was 54 mg/ml. Accordingly, it was also found that films of this dye could be formed easily by solution-coating. Further, since the compound has a decomposition temperature of 202.7° C., it has also good thermal stability required for an optical switch material.

Example 2

Production of Compound (2)

363 mg (2.0 mmol) of 3,5-dihydroxy-N,N-diethylaniline and 142 mg (1.0 mmol) of 4,5-dihydroxy-4-cyclopentene-1,2,3-trione were added to a mixed solution of 30 ml of 1-propanol and 15 ml of N,N-dimethylformamide. The reaction solution was stirred in an atmosphere of nitrogen gas, heated at 60 to 65° C. for two hours, then further heated to 96° C. and reacted at 96 to 104° C. for two hours. Water formed by the reaction was removed by azeotropic distillation. After the reaction was completed, 1-propanol was removed by distillation under a reduced pressure, and 300 ml of water was added to the resulting mixture. The precipitated solids were filtered, washed with water, and then dried in air to give a brown-purple solid. A purple fraction was fractionated from the solid by flash column chromatography (filler: neutral silica gel; developing solvent: chloroform, and a mixed solvent of chloroform and methanol (volume ratio: 100:1)), to give a black-purple solid.

The black-purple solid was purified by recrystallization from methanol, a mixed solvent of acetone and hexane, a mixed solvent of acetone and methanol and a mixed solvent of dichloromethane and methanol successively, and dried to give the target compound (2) (a compound of the general formula (I) in which both $R_1$ and $R_2$ represent ethyl groups) (black-purple microcrystals), 8.5 mg (yield 1.8%).

Figure 3:
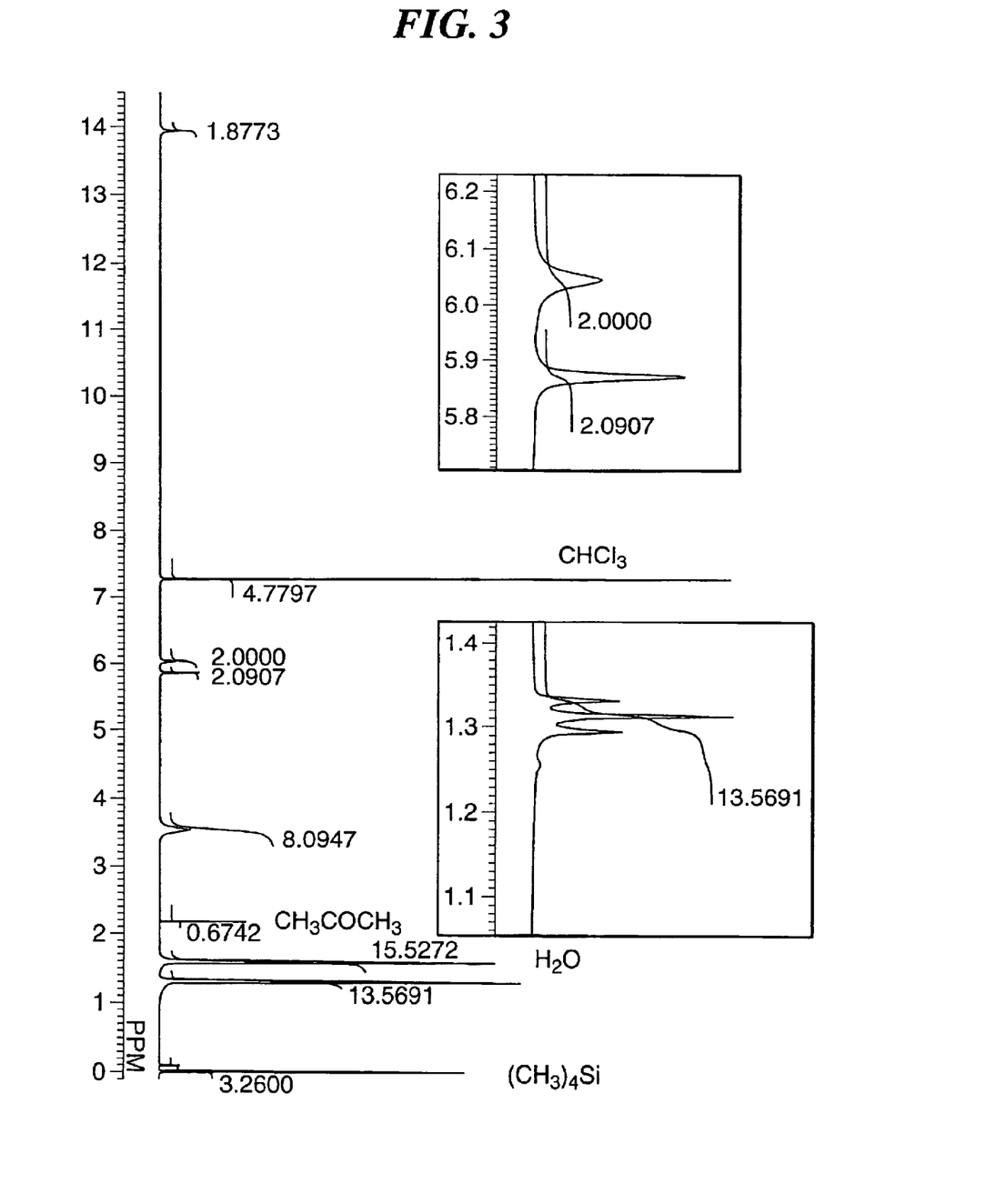
FIG. 3 is a graph showing $^1$H-NMR spectra (in a CDCl$_3$ solution) for the compound produced in Example 2.

$^1$H-NMR spectrum (CDCl$_3$) (FIG. 3): δ=13.926 (s, 2H, OH), 6.045 (s, 2H, H$_{arom}$), 5.870 (s, 2H, H$_{arom}$), 3.549 (br s, 8H, 4×NCH$_2$), 1.313 (t, J=7.08 Hz, 12H, 4×CH$_3$).

Figure 4:
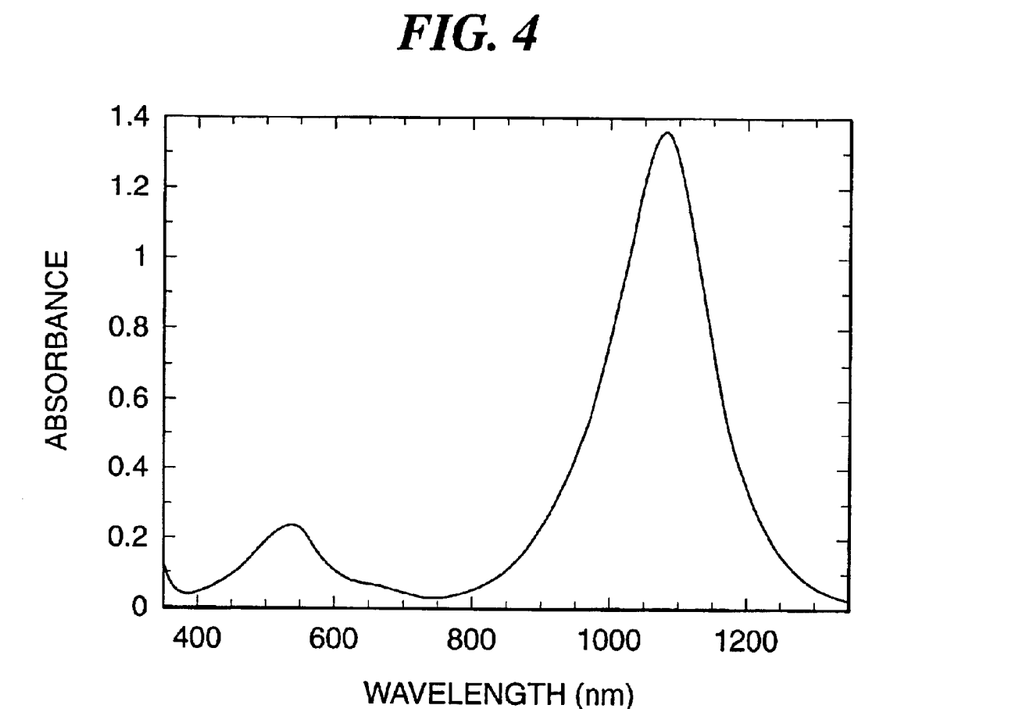
FIG. 4 is a graph showing absorption spectrum (in a dichloroethane solution) for the compound produced in Example 2.

Visible-near-infrared absorption spectrum (FIG. 4):

$\lambda_{max}$=1078 nm (in chloroform solution)

Further, the solubility of this compound in chloroform was 3 mg/ml. Accordingly, it was also found that films of this dye could be easily fabricated by solution-coating. Further, the compound had a decomposition point of 200° C. or higher, so its thermal stability was also satisfactory.

The novel compounds according to this invention have maximum absorption wavelengths of over 1 μm and have high thermal stability and good solubility in organic solvents.

The entire disclosure of Japanese Patent Application No. 2002-99794 filed on Apr. 2, 2002 including specification, claims, drawings and abstract is incorporated herein by reference in its entirety.

What is claimed is:

1. A compound represented by the following general formula (I):

General Formula (I)

where $R_1$ and $R_2$ is identical or different from each other and each represents a linear alkyl group or a branched alkyl group, respectively.

2. The compound according to claim 1, wherein $R_1$ and $R_2$ in the general formula (I) is identical or different from each other and each represents a linear alkyl group of 1 to 7 carbon atoms or a branched alkyl group of 3 to 7 carbon atoms, respectively.

3. The compound according to claim 1, wherein both $R_1$ and $R_2$ in the general formula (I) represent isobutyl groups.

4. A method for producing a compound represented by the following general formula (I),

General formula (I)

comprising:

reacting an aniline derivative represented by a general formula (II) and 4,5-dihydroxy-4-cyclopentene-1,2,3- trione shown by a general formula (III),

General formula (II)

General formula (III)

where $R_1$ and $R_2$ is identical or different from each other and each represents a linear alkyl group or a branched alkyl group, respectively.

5. The method for producing a compound according to claim 4, wherein $R_1$ and $R_2$ in the general formula (II) is identical or different from each other and each represents a linear alkyl group of 1 to 7 carbon atoms or a branched alkyl group of 3 to 7 carbon atoms, respectively.

6. The method for producing the compound according to claim 4, wherein both $R_1$ and $R_2$ in the general formula (II) are isobutyl groups.

* * * * *